United States Patent [19]

Grey

[11] Patent Number: 4,983,283

[45] Date of Patent: Jan. 8, 1991

[54] CYCLONE SEPARATOR

[75] Inventor: Mark I. Grey, South Yarra, Australia

[73] Assignee: Conoco Specialty Products Inc., Houston, Tex.

[21] Appl. No.: 515,542

[22] Filed: Apr. 23, 1990

Related U.S. Application Data

[63] Continuation of Ser. No. 271,858, filed as PCT AU87/00057 on Feb. 27, 1987, published as WO87/05234 on Sept. 11, 1987, abandoned.

[30] Foreign Application Priority Data

Feb. 28, 1987 [AU] Australia ................... OG4728.75

[51] Int. Cl.$^5$ ............................................. B01D 19/00
[52] U.S. Cl. .................................. 210/104; 210/512.1; 55/459.5
[58] Field of Search ........................... 55/15, 459.5; 210/512.1, 512.3, 104

[56] References Cited

U.S. PATENT DOCUMENTS

| | | | |
|---|---|---|---|
| 2,290,664 | 7/1942 | Allardia | 55/459.5 X |
| 2,578,568 | 11/1951 | Mayer et al. | 55/459.5 X |
| 3,513,642 | 5/1970 | Cornett | 55/459.5 X |
| 3,559,373 | 2/1971 | Marrett | 55/15 |
| 4,369,047 | 1/1983 | Arscott et al. | 210/512.1 X |
| 4,597,871 | 7/1986 | Okouchi et al. | 210/512.1 X |

FOREIGN PATENT DOCUMENTS

8137/22 8/1922 Australia .

Primary Examiner—Charles Hart
Attorney, Agent, or Firm—John E. Holder

[57] ABSTRACT

A cyclone separator comprising an elongated separating chamber having a longitudinal axis of symmetry between opposite first and second ends, the separator including at least one feed inlet (3) adjacent the first end and at least two outlets (4), (5), the cyclone separator being characterized by the provision of control means (12) which is adapted to vary the cross-sectional dimension of the or one or more of the feed inlets (3).

18 Claims, 6 Drawing Sheets

CYCLONE SEPARATOR

BACKGROUND OF THE INVENTION

This application is a continuation of application Ser. No. 271,858 filed as PCT AU87/00057 on Feb. 27, 1987, published as WO87/05234 on Sep. 11, 1987, now abandoned.

This invention relates generally to cyclone separators for separating multi-phase mixtures such as, for example, oil/water mixtures.

Applicant has invented several forms of cyclone separtors which are particularly suitable for use with oil/water mixtures and which have varying constructions depending upon the applications of the separators. Generally, however, the cyclone separators comprise an elongated separating chamber having a feed inlet proximate to one end thereof and, in most cases, an overflow outlet at that end and an underflow outlet at the opposite end thereof, the overflow outlet being for removing the less dense phase and the underflow outlet for the more dense phase.

In applicant's co-pending application numbers PCT/AU85/00010 and PCT/AU85/00166, applicant discloses a particularly advantageous form of feed inlet for use with oil/water mixtures.

Whilst the feed inlet as described in the aforementioned specifications provide significant advantage of the prior art, optimum efficiency can vary due to the make up of the mixture being supplied to the separator. In some instances, the oil within the mixture may be in the form of small oil droplets whereas in other instances, the mixture may contain relatively large droplets.

It is an object of the present invention to provide an improved cyclone separator which is adapted to operate at a controlled maximum efficiency.

SUMMARY OF THE INVENTION

According to the present invention there is provided a cyclone separator comprising an elongated separating chamber having a longitudinal axis of symmetry between opposite first and second ends, the separator including at least one feed inlet adjacent the first end and at least two outlets, the cyclone separator being characterised by the provision of control means which is adapted to vary the cross-sectional dimension of the or one or more of the feed inlets.

BRIEF DESCRIPTION OF THE DRAWINGS

Preferred embodiments of the invention will hereinafter be described with reference to the accompanying drawings in which.

DETAILED DESCRIPTION

Figure 3:
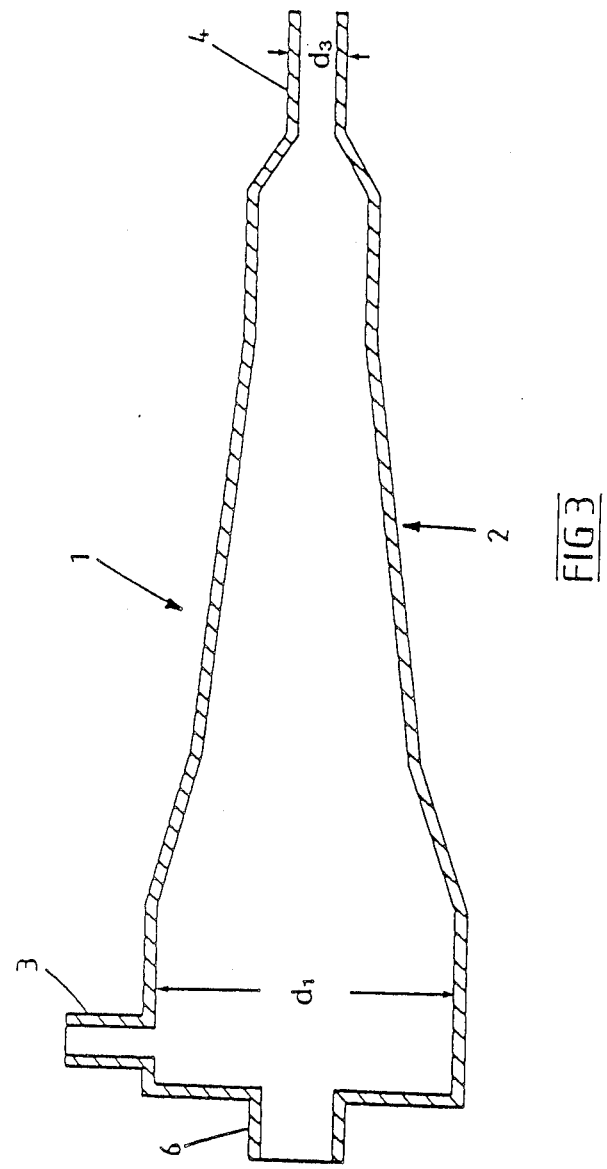
FIG. 3 is a schematic sectional side elevation of a typical cyclone separator.

Referring firstly to FIG. 3, a type of cyclone separator generally indicated at 1 is shown and comprises a separating chamber 2 having at least one feed inlet 3 and an underflow outlet 4 and an overflow outlet 5. The cyclone separator shown is only of a general form but may for example take the specific form of that described in PCT/AU85/00166 or any other suitable configuration.

The separator functions generally in accordance with past practice in that the fluid mixture admitted into the separating chamber via the feed inlet 3 is subjected to centrifugal action causing the separated liquid components to be ejected, on the one hand from the outlet and on the other through the outlet 5. Thus, the denser phase material flows to the underflow outlet 4 in an annular cross-sectioned flow around the wall of the separating chamber whilst the lighter phase forms a central core which is subjected to differential pressure action driving the fluid therein out the overflow outlet 5.

Figure 4:
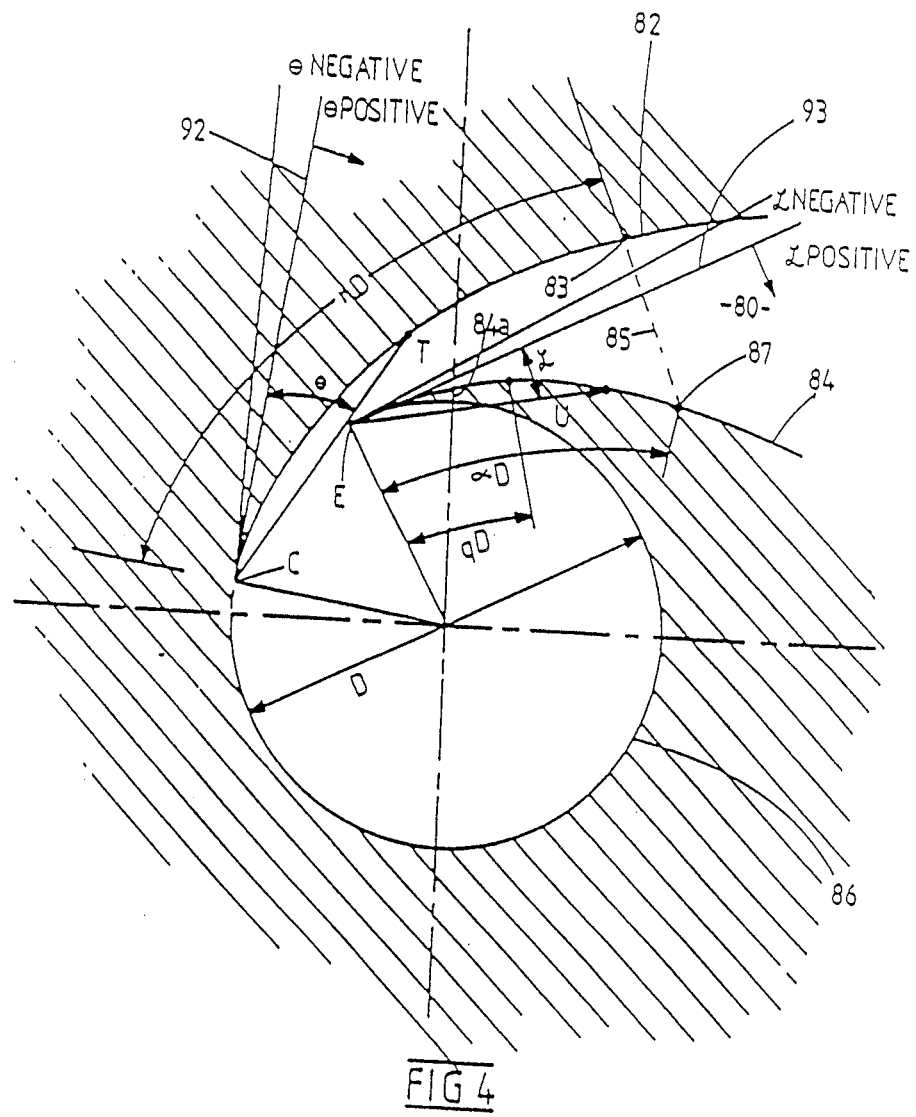
FIG. 4 is a detailed axial cross-sectional view of the feed inlet of a cyclone separator as described in PCT/AU85/00166.

Referring now to FIG. 4, an inlet profile of the type described in PCT/AU85/00166 is shown in more detail. Here, the feed inlet of the separator is shown as comprising an inlet tract 80 together with a portion of the separating chamber of the separator which is lengthwise adjacent thereto. In this regard, generally, although the separator shown in FIG. 3 is described as having distinct portions of successively decreasing diameters, it is not essential that the separator be so formed as it could, for example, exhibit any generally tapered configuration extending from a larger diameter end adjacent the overflow outlet to a smaller cross-section end adjacent the underflow outlet. The tract 80 is shown as having an outer profile 82 and an inner profile 84. Here, the diameter D of the cyclone separator as shown in FIG. 4 corresponds to the diameter $d_1$ in FIG. 3, since the inlet tract 80 (as in the case of the FIG. 3 construction) communicates with the separating chamber at the larger diameter end thereof.

The tract 80 is considered as extending from a location indicated generally by reference numeral 85 inwardly towards the separating chamber. The location 85 is defined as a point beyond which, reckoned in the direction inwardly towards the separating chamber the flow of inlet liquid cannot be described by the simple flow equations. More particularly, the points 83, 87 on the outer and inner profiles aligned were projected outwardly therefrom in parallel relationship the separator would operate substantially the same as if the profiles were continued in the profiled configurations described. By the term "outwardly projected" is meant a projection from the respective profile which is substantially tangential at the point of meeting the respective profile. From the respective points 83, 87 on the outer and inner profiles respectively the profiles extend in spiral fashion inwardly to meet the circumferential surface 86 of the separating chamber. Locations at which the profiles so meet circumference 86 are designated respectively by letters "C" and "E". Practically, although the profile 84 is shown as joining circumference 86 by continuance of the profile inwardly until it meets the circumference 86 at the point "E", for mechanical reasons it is frequently simpler and more effective to round the juction between the profile 84 and the circumference 86 by providing a rounded portion 84a (indicated by broken lines).

The inner and outer profiles preferably generally described by the following equations:-

$$\alpha < \eta < 2\pi + \alpha \quad \text{(a)}$$

$$0.35 < \alpha < \quad \text{(b)}$$

where $\eta D$ is the length of the outer profile 82 of the inlet tract, viewed axially of the separating chamber, D being the diameter of the portion of the separating chamber at which circumference 86 prevails. This profile length is that extending between points "C" and 83. $\alpha D$ is the length of the inner profile 84, viewed axially of the separating chamber. This profile length is that extending between points "E" and 87.

Generally, the outer profile 82 is such that vector T describing the location of any particular point on outer profile and contained in a plane normal to said axis, and having its origin at location "C", is such that as the magnitude of the vector T increases, an angle $\theta$ between the vector T and a tangent 92 to circumference 86 passing through said location "C" never decreases substantially and never becomes less than negative 0.1 radian for all magnitudes of T less than D $\eta$ (d) Similarly, a vector U, describing the location of any particular point on the inner profile 84 and having its point of origin at location "E" is such that as the magnitude of vector U increases, the angle $\zeta$ between vector U and a tangent 93 to said circumference which passes through said location "E" never decreases and never becomes less than negative 0.52 radian, for all magnitude of vector U less than $\alpha$ D, at least for substantial magnitudes of vector U. By substantial magnitude of vector U, we mean that in the vicinity of the location "E", vector U may not be defined because of possible rounding of inner profile as previously described.

The cross-sectional area $A_i$ of the tract 80 measured in a radial and axial plane passing through the location where the inner profile 84 actually terminates (location "E", or the extremity of the portion 84a as the case may be) is preferably defined as:-

$$0.02 < 4A_i/\pi D^2 < 0.1$$

It is also preferred that the following relationship holds between the constants $\eta$ and $\alpha$ $$\alpha < \eta < 2\pi + \alpha$$

The described relationship between the constants $\alpha$ and $\eta$ is most appropriate where, relatively speaking, the separator has a maximum diameter which is relatively more than the diameter of the underflow outlet. However where this ratio is relatively smaller, such as less than 3 it may be preferable to place greater restrictions on the relative values of the constants $\alpha$ and $\eta$. The following may then be appropriate:-

$$D/d \leq 3$$
$$\alpha < \eta < 2\pi + \alpha, \text{ and } 0.35 < \alpha < 1.5.$$

Here, d represents the underflow outlet diameter corresponding to diameter $d_3$ in FIG. 3.

Figure 5:
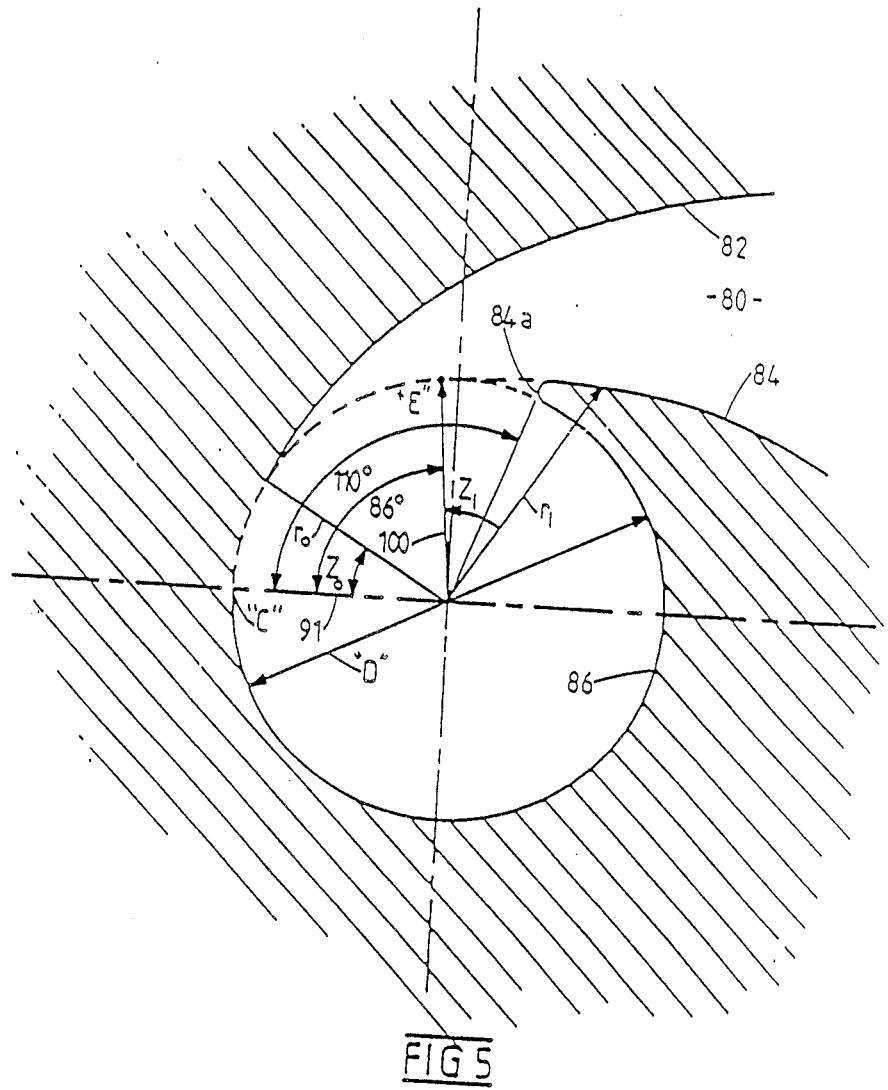
FIG. 5 is a similar view to that of FIG. 4 but showing preferred profiles.

Referring now to FIG. 5, in one construction in accordance with the invention, the angle $\rho$ measured about the axis of the separator between the points "C" and "E" was 86°. The inner profile 84 was terminated by a curved portion 84a co-joining with circumference 86, this portion had a curvature of approximately 0.5 mm and located some 110° around the axis of the separator from the point "C". In this instance, it was found that the following mathematical relationship was appropriate for describing the profiles 82, 84:

$$r_0 = 0.5 D + 0.0143 D Z_0^{1.4} + 0.0057 D Z_0^{1.8} +$$
$$0.00157 D Z_0^{2.8} + 0.00286 D Z_0^{4.5}$$
$$r_i = 0.5 D + 0.0714 D Z_i^2 + 0.00714 D Z_i^3 +$$
$$0.0143 D Z_i^4 + 0.00714 D Z_i^5$$

where $r_O$ is the distance from the axis of the separator to any particular point on the outer profile 82, $r_i$ is the distance from the axis of the separator to any particular point on the inner profile 84, $Z_O$ is the angle, reckoned from the line 91 joining the axis of the separator and the point "C", in a clockwise direction around the axis of the separator to any point on the outer profile 82 and $Z_i$ is the angle, reckoned from the line 100 in a clockwise direction to any particular point on the inner profile 84. These equations describing the profiles 82, 84 generally may prevail for angles $Z_O$, $Z_i$ in the range $$0° < Z_O < 150°$$
$$0° > Z_i > 60°$$

or at least in the range $$24° > Z_i > 60°$$

The tract 80 may have a rectangular transverse cross-section such as having longer sides extending parallel to the axis of the separator and of length W and shorter sides contained in planes normal to the axis of the separator and of length t. In this case the following relationships may prevail:

$$t \times W = A_i, \text{ and}$$
$$D/35 < t < D/6.$$

Generally, W will be greater than t.

While forming the feed inlet of the separator with the described configurations permits only a single inlet to be employed, the described configurations may be advantageously employed even where more than one inlet is provided.

The term "involute" is used in this specification to describe a curve being the locus of the end of a piece of string uncoiled from a base circle. The inner and outer profiles of the or each inlet tract as described are generally formed as involute curves. Each profile may however, have cojoining sections defined by cojoining involute curves having respective defining base circles of differing diameters, or the projected start points on the respective base circles may be relatively circumferentially spaced.

Figure 1:
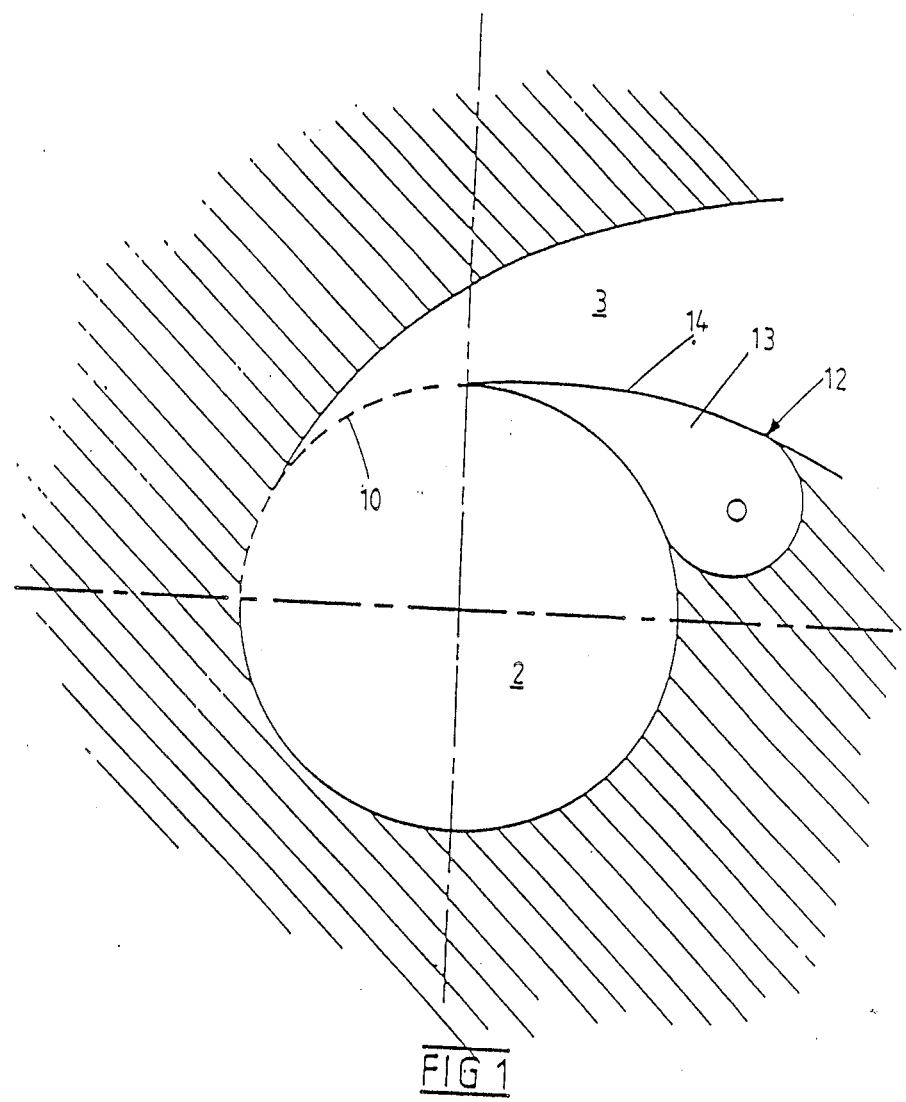
FIG. 1 is a cross-sectional side elevation of one form of feed inlet according to the present invention.
Figure 2:
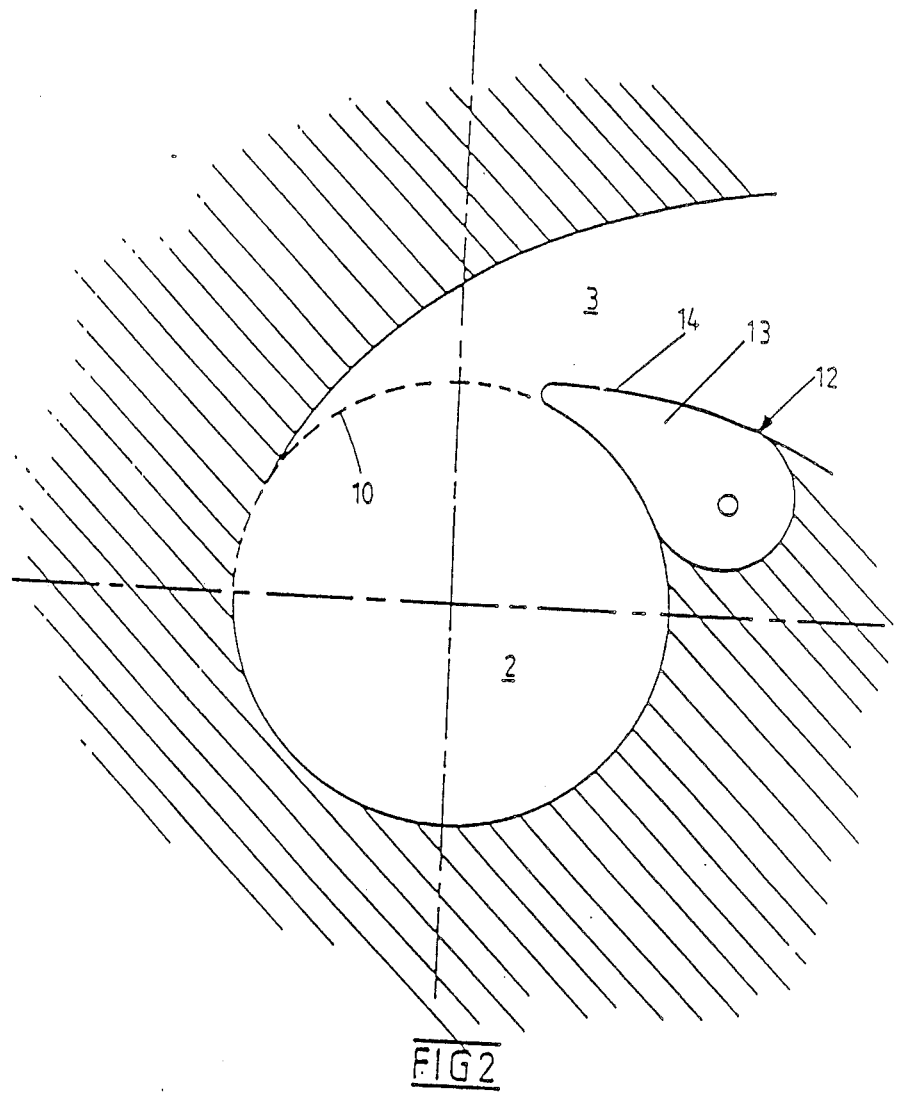
FIG. 2 is a cross-sectional side elevation of another form of feed inlet according to the invention.

Referring to FIGS. 1 and 2 of the drawings, the feed inlet 3 comprises an adjustable control member 12 in the form of a pivotally mounted flap 13. The flap 13 has a contoured surface 14 which conforms to the inner profile as shown in FIGS. 4 and 5. The control member shown in FIG. 2 is the same as that shown in FIG. 1 except that the leading edge thereof has been shortened.

The control member 12 is adapted to increase or reduce the cross-sectional dimension of feed inlet 3 depending on the type of mixture being handled by the cyclone separator. Movement of the control member 12 may be effected manually or by a suitable form of drive means operatively connected thereto.

Where a drive means is used a control system may be provided for sensing the condition of the incoming mixture the drive means being responsive to signals received from the control system. By such an arrangement, the cyclone separator can separate at all times at substantially maximum efficiency.

Figure 6:
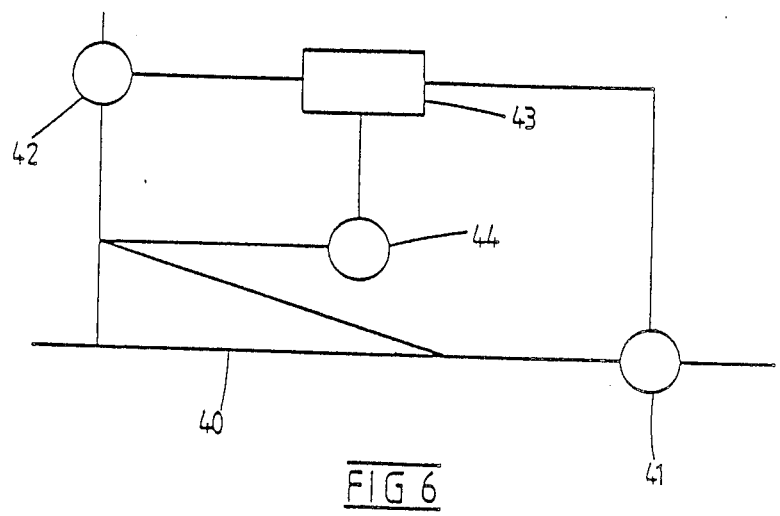
FIG. 6 is a block diagram of a control system according to the invention.

Referring to FIG. 6, the control system for cyclone separator 40 may comprise two purameters 41 and 42 for measuring the concentration of the mixture. These purameters are operatively connected to a mircoprocessor 43 which assesses the information provided from the purameters. The microprocesser provides a signal to moter 44 which in turn controls the opening or closing of the flap.

In practice it is best to have the inlet opening open a selected distance depending on the drop size distribution in the mixture the size of the droplets having an effect on the efficiency of the operation of the separator.

I claim:

1. A cyclone separator for multi-phase liquid mixtures for separating denser liquid components of the mixture from less dense liquid components thereof, the cyclone separator comprising an axially extending separating chamber having towards one end inlet means for admission of the mixture with a tangential flow component, wherein one of said liquid components forms droplets within the other liquid component and further wherein the distribution of such droplets is determinative of the efficiency of the separator, with the efficiency in turn being affected by variations in the cross-sectional area of the inlet means, the separating chamber having an axially positioned overflow outlet adjacent said one end, said separating chamber being generally open and unobstructed and of a generally tapered configuration with a relatively large cross-sectional size at said one end and a relatively small cross-sectional size at an axially positioned underflow outlet at the end of the separating chamber opposite said one end, wherein, in use, the denser component is directed to the underflow outlet in a fashion such as to encompass an inner axially positioned core of the less dense component which is subjected at least over a substantial part of its length to a pressure differential causing it to flow in an unobstructed axial path to said overflow outlet, the cyclone separator further including control means which comprises a flap-like member mounted for pivotal movement and disposed at or adjacent said inlet means so that pivotal movement thereof causes variation of the cross-sectional dimension of said inlet means, said separating chamber having its inner wall at the inlet end thereof defined by an unobstructed inner circumferential surface and wherein said flap like member is arranged so that it does not extend into the separation chamber beyond a projection of said inner circumferential surface through the inlet area of the separation chamber.

2. A cyclone separator according to claim 1 wherein said feed inlet is defined by a portion of the separating chamber and at least one inlet tract communicating with that portion, said portion being that portion of the separating chamber which is at the same lengthwise position as the or each inlet tract, wherein the or each inlet tract presents inner and outer profiles, when viewed axially of the separator, at least the inward projection of said inner profile extending from a location at which the inner profile or its said projection meets the circumference of said portion characterised in that said flap member (13) comprises a control surface (14) defining said inner profile and is characterised by a vector U describing the location of any particular point on the inner profile and having its point of origin at said second location is such that as the magnitude of vector U increases, an angle $\rho$ between vector U and that tangent to said circumference which passes through said location never decreases substantially and never becomes less than negative 0.52 radian, at least for substantial magnitudes of vector U.

3. A cyclone separator according to claim 2 wherein said outer profile extends from a location at which it meets the circumference of said portion of the separating chamber, said outer profile being characterised in that a vector T describing the location of any particular point on said outer profile and contained in a plane normal to said axis, and having its origin at said first location, is such that as the magnitude of the vector T increases, an angle $\theta$ between the vector T and that tangent to said circumference which passes through said first location never decreases substantially and never becomes less than negative 0.1 radian; the cross-sectional area perpendicular to the direction of flow generally contracting in the direction of flow.

4. A cyclone separator as claimed in claim 3 wherein said inlet means is characterised in that as said magnitude of said first vector T increases said angle $\theta$ never decreases substantially and never becomes less than negative 0.1 radian for all magnitudes of vector T less than $\eta D$, and that as said second vector U increases, said angle $\zeta$ never decreases substantially and never becomes less than negative 0.52 radian for at all magnitudes of vector U less than $\alpha D$, at least for substantial magnitudes of vector J, where $$\alpha < \eta < 2\pi + \alpha \tag{c}$$

$$0.35 < \alpha < 1.5, \text{ where} \tag{d}$$

$\eta D$ being the length of the outer profile of the inlet tract, viewed axially of the separating chamber, D being the diameter of said portion of the separating chamber $\alpha D$ being the length of the inner profile of the inlet tract viewed axially of the separating chamber, $\eta D$ being measured from a first location at which the outer profile meets the circumference of its portion of the separating chamber and $\alpha D$ being measured from a second location at which at least an inward projection of the inner profile meets said circumference.

5. A cyclone separator as claimed in claim 4 wherein $$0.02 < 4A_i/\pi D^2 < 0.1 \tag{e}$$

where $A_i$ is the cross-sectional area of said tract, or the combined cross-sectional area of all said tracts, if there are more than one tract, the or each cross-sectional area being measured in a plane substantially perpendicular to tract inlet flow and intersecting the point of termination of said inner profile.

6. A cyclone separator as claimed in claim 5 characterised in that $$\alpha < \eta < \pi + \alpha \tag{f}$$

7. A cyclone separator as claimed in claim 5 wherein the or each tract is of rectangular cross-section over at least a length qD for $q < \alpha$ the cross-section over at least a length $W_n$ and a width $t_n$ where $$\Sigma t_n \times W_n = A_i, \text{ and} \tag{g}$$

$$D/35 < t < D/6 \tag{h}$$

where $W_n$ is the length of the cross-sectional of the $n^{th}$ tract and $t_n$ is the width of the $n^{th}$ tract.

8. A cyclone separator as claimed in claim 7 wherein the sides of the or each cross-section of length W are aligned generally in the axial direction of the separator and those of width t are aligned generally normally to the axis of the separator.

9. A cyclone separator as claimed in claim 8 where $W > t$.

10. A cyclone separator as claimed in claim 1 wherein the or each tract extends at a respective angle to the axis of the separator, when viewed normally of said axis, wherein the respective angle $\rho$ between said axis and the main inlet flow direction for liquid mixture when admitted through a respective inlet tract, at the point where the mean flow path intersects the said respective tract cross-section at which the area $A_i$ is measured, is $$80° < \rho < 95° \qquad (j)$$

where the angle $\rho$ is defined such that for values thereof less than 90° the liquid flow into the separating chamber in use, along said flow path, has a motional component which is directed in the direction from the larger diameter to the smaller diameter end of the separating chamber.

11. A cyclone separator as claimed in claim 1, wherein the or each inlet tract is of substantially involute form.

12. A cyclone separator as claimed in claim 1 wherein the or each inlet tract has an outer profile of substantially involute form.

13. A cyclone separator as claimed in claim 6 wherein the or each tract is of rectangular cross-section over at least a length qD for $q < \alpha$ the cross-section over at least $\alpha$ length $W_n$ and a width $t_n$ where $$\Sigma t_n \times W_n = A_i, \text{ and} \qquad (g)$$

$$D/35 < t < D/6 \qquad (h)$$

where $W_n$ is the length of the cross-sectional of the $n^{th}$ tract and $t_n$ is the width of the $n^{th}$ tract.

14. The cyclone separator of claim 1 wherein said inlet means is comprised of an inlet tract having upper and lower profiles intersecting with and terminating in a feed inlet near said one end of said separating chamber.

15. The cyclone separator of claim 14 wherein $0.02 < 4A_i/\pi D^2 < 0.1$ where $A_i$ is the cross-sectional area of the inlet tract measured in a plane substantially perpendicular to the inlet tract at a point of termination of the lower profile of the inlet tract with the feed inlet in the one end of the separating chamber, and D is the diameter of the separation chamber at the feed inlet.

16. A cyclone separator for multi-phase liquid hydrocarbon and water mixtures to separate denser liquid components of the mixture from less dense liquid components thereof, with one liquid phase of the mixture being in the form of droplets forming an emulsion in the other liquid phase, and with the distribution of such droplets in the emulsion being determinative of the efficiency of the separator, the cyclone separator comprising;

an axially extending separating chamber having an inlet means at one end for admission of the hydrocarbon and water mixture, such admission having a tangential flow component which when varied is operative to affect the efficiency of the separator, said separating chamber having an unobstructed inner circumferential surface at its inlet end;

an axially positioned overflow outlet adjacent said one end of said separating chamber, said separating chamber being open and unobstructed throughout its length and having a generally tapered or stepped configuration to form a relatively large cross-sectional size at said one end and a relatively small cross-sectional size at the other end;

underflow outlet means adjacent the other end of the separating chamber opposite said one end, wherein, in use, the denser liquid component of the mixture is directed to the underflow outlet in a fashion such as to encompass an inner axially positioned core of the less dense liquid component which is subjected at least over a substantial part of its length within the chamber to a pressure differential causing it to flow in an unobstructed axial path to said overflow outlet; and control means arranged in the inlet means for varying the tangential flow component to thereby affect the separation efficiency of the separator by varying the cross-section area of the inlet in a manner that prevents shear forces from being applied to the admitted mixture, said control means being arranged in the inlet means so that said control means does not extend beyond a projection of said inner circumferential surface through said inlet means.

17. The cyclone separator of claim 16 wherein said inlet means is comprised of an inlet tract having upper and lower profiles intersecting with and terminating in a feed inlet near said one end of said separating chamber to form the tangential flow component of the admitted mixture.

18. The cyclone separator of claim 17 wherein $0.02 < 4A_i/\pi D^2 < 0.1$ where $A_i$ is the cross-sectional area of the inlet tract measured in a plane substantially perpendicular to the inlet tract at a point of termination of the lower profile of the inlet tract with the feed inlet in the one end of the separating chamber and D is the diameter of the separating chamber at said feed inlet.

* * * * *

UNITED STATES PATENT AND TRADEMARK OFFICE
CERTIFICATE OF CORRECTION

PATENT NO. : 4,983,283
DATED : January 8, 1991
INVENTOR(S) : Mark I. Grey

It is certified that error appears in the above-identified patent and that said Letters Patent is hereby corrected as shown below:

Column 2, line 43, after "aligned" insert --with location 85 are points where, if the profiles--.

Column 2, line 68, the equation "$0.35 < a <$ " should read --$0.35 < a < 2$--.

Column 6, line 4, "$p$" should be --$\alpha$--.

Signed and Sealed this

Eleventh Day of August, 1992

Attest:

DOUGLAS B. COMER

*Attesting Officer*     *Acting Commissioner of Patents and Trademarks*